(12) United States Patent
Gerty et al.

(10) Patent No.: US 10,746,255 B2
(45) Date of Patent: Aug. 18, 2020

(54) SYSTEMS AND METHODS FOR REDUCING NOISE, VIBRATION, AND/OR HARSHNESS DURING ENGINE SHUTDOWN AND RESTART

(71) Applicant: PACCAR Inc, Bellevue, WA (US)

(72) Inventors: Michael D. Gerty, Bellingham, WA (US); Uday Vadlamani, Burlington, WA (US)

(73) Assignee: PACCAR INC, Bellevue, WA (US)

( * ) Notice: Subject to any disclaimer, the term of this patent is extended or adjusted under 35 U.S.C. 154(b) by 10 days.

(21) Appl. No.: 15/975,586

(22) Filed: May 9, 2018

(65) Prior Publication Data

US 2019/0346011 A1 Nov. 14, 2019

(51) Int. Cl.
| | |
|---|---|
| *F16F 15/26* | (2006.01) |
| *F02D 41/06* | (2006.01) |
| *F02D 41/04* | (2006.01) |
| *F02B 67/08* | (2006.01) |
| *F02B 75/06* | (2006.01) |

(52) U.S. Cl.
CPC ............ *F16F 15/264* (2013.01); *F02B 67/08* (2013.01); *F02B 75/06* (2013.01); *F02D 41/042* (2013.01); *F02D 41/062* (2013.01); *F02D 2250/18* (2013.01); *F02D 2250/28* (2013.01)

(58) Field of Classification Search
CPC ......... F16F 15/264; F02B 67/08; F02B 75/06; F02D 41/042; F02D 41/062; F02D 41/009; B60W 20/10
See application file for complete search history.

(56) References Cited

U.S. PATENT DOCUMENTS

| | | | |
|---|---|---|---|
| 4,615,227 | A | 10/1986 | Stockton |
| 4,706,522 | A | 11/1987 | Nitz |
| 6,434,453 | B1 | 8/2002 | Kuroda et al. |
| 6,463,900 | B1 | 10/2002 | Wakabayashi |
| 6,487,998 | B1 | 12/2002 | Masberg et al. |

(Continued)

FOREIGN PATENT DOCUMENTS

| | | |
|---|---|---|
| DE | 10 2009 006 664 A1 | 9/2010 |
| EP | 1 052 401 A2 | 11/2000 |

(Continued)

OTHER PUBLICATIONS

Notice of Allowance dated Jul. 17, 2019, issued in U.S. Appl. No. 15/716,315, filed Sep. 26, 2017, 6 pages.

(Continued)

*Primary Examiner* — Syed O Hasan

(57) ABSTRACT

In some embodiments of the present disclosure, an electric motor is used to generate correction torques to counteract unwanted torque pulses generated by an internal combustion engine during startup and/or shutdown. In some embodiments, the electric motor may be mounted to an accessory drive such as a power take-off mechanism or a front end accessory drive (FEAD). In some embodiments, the correction torques may be used to enforce an engine speed target profile for startup or shutdown, and may be determined using a feedback control loop based on the engine speed. The correction torques help to reduce or eliminate noise, vibration, and/or harshness (NVH) during startup and/or shutdown.

20 Claims, 6 Drawing Sheets

(56) References Cited

U.S. PATENT DOCUMENTS

| | | | |
|---|---|---|---|
| 6,616,569 B2 | 9/2003 | Hoang et al. | |
| 6,629,515 B1 | 10/2003 | Yamamoto et al. | |
| 6,763,903 B2 | 7/2004 | Morimoto et al. | |
| 7,657,350 B2 | 2/2010 | Moran | |
| 7,663,505 B2 | 2/2010 | Publicover | |
| 8,296,030 B2 | 10/2012 | Luo | |
| 8,386,148 B2 | 2/2013 | Hyde | |
| 8,419,592 B2 | 4/2013 | Fujiwara | |
| 8,457,822 B2 | 6/2013 | Ketfi-Cherif et al. | |
| 8,532,843 B2 | 9/2013 | Nagura et al. | |
| 8,594,912 B2 | 11/2013 | Weaver | |
| 8,972,145 B2 | 3/2015 | Mahler et al. | |
| 9,228,554 B2 | 1/2016 | Balzer | |
| 9,266,523 B2 | 2/2016 | Ideshio et al. | |
| 9,293,043 B2 | 3/2016 | Yamada | |
| 9,349,289 B1 | 5/2016 | Taylor | |
| 9,409,567 B2 | 8/2016 | Otake | |
| 9,447,741 B2 | 9/2016 | Yang | |
| 9,587,559 B2 | 3/2017 | Hemphill | |
| 9,664,136 B2 | 5/2017 | Boesch | |
| 9,926,881 B2 | 3/2018 | Sangameswaran | |
| 9,957,941 B1 | 5/2018 | Gerty et al. | |
| 10,081,361 B2 | 9/2018 | Books | |
| 10,190,511 B2 | 1/2019 | Abdul-Rasool | |
| 10,190,560 B2 | 1/2019 | Tedesco | |
| 10,451,022 B2 | 10/2019 | Gerty | |
| 10,487,762 B2 | 11/2019 | Vadlamani | |
| 2009/0118914 A1* | 5/2009 | Schwenke | B60K 6/445 |
| | | | 701/51 |
| 2010/0019446 A1 | 1/2010 | Matsumoto et al. | |
| 2010/0125402 A1 | 5/2010 | Bansal | |
| 2011/0136620 A1 | 6/2011 | Gibson et al. | |
| 2011/0153119 A1 | 6/2011 | Lee et al. | |
| 2012/0029730 A1 | 2/2012 | Nagura et al. | |
| 2012/0100960 A1 | 4/2012 | Pedlar et al. | |
| 2012/0226433 A1 | 9/2012 | Hasan et al. | |
| 2013/0158838 A1 | 6/2013 | Yorke et al. | |
| 2014/0046577 A1 | 2/2014 | Wang et al. | |
| 2014/0107878 A1 | 4/2014 | Takahashi et al. | |
| 2014/0207348 A1 | 7/2014 | Wakayama et al. | |
| 2014/0209059 A1 | 7/2014 | Kojima et al. | |
| 2014/0336908 A1 | 11/2014 | Mori et al. | |
| 2015/0158491 A1 | 6/2015 | Suzuki et al. | |
| 2015/0166065 A1 | 6/2015 | Kuroki et al. | |
| 2015/0175149 A1 | 6/2015 | Zhao et al. | |
| 2015/0210261 A1 | 7/2015 | Mitsuyasu | |
| 2015/0232099 A1 | 8/2015 | Miller et al. | |
| 2015/0259008 A1 | 9/2015 | Seguchi | |
| 2015/0275787 A1 | 10/2015 | Dufford et al. | |
| 2015/0275840 A1 | 10/2015 | Sawada | |
| 2015/0369199 A1 | 12/2015 | Nakamura | |
| 2016/0019792 A1 | 1/2016 | Kawamata et al. | |
| 2016/0040745 A1* | 2/2016 | Goossens | F16F 15/03 |
| | | | 123/192.2 |
| 2016/0107648 A1 | 4/2016 | Carlson | |
| 2016/0230821 A1 | 8/2016 | Morino et al. | |
| 2017/0067433 A1 | 3/2017 | Ahn | |
| 2017/0080919 A1 | 3/2017 | Follen et al. | |
| 2017/0174218 A1 | 6/2017 | Hansen et al. | |
| 2017/0240162 A1 | 8/2017 | Higashitani et al. | |
| 2017/0247025 A1* | 8/2017 | Velazquez Alcantar | |
| | | | B60L 15/2054 |
| 2017/0282921 A1 | 10/2017 | Limbacher | |
| 2017/0306893 A1 | 10/2017 | Leone | |
| 2017/0330456 A1 | 11/2017 | Miller | |
| 2017/0349179 A1 | 12/2017 | Cunningham et al. | |
| 2017/0350360 A1 | 12/2017 | Tedesco et al. | |
| 2018/0057001 A1 | 3/2018 | Hu et al. | |
| 2018/0080425 A1 | 3/2018 | Ose et al. | |
| 2018/0119662 A1 | 5/2018 | Gerty | |
| 2018/0120841 A1 | 5/2018 | Endo et al. | |
| 2018/0202379 A1 | 7/2018 | Nagashima et al. | |
| 2018/0202408 A1 | 7/2018 | Majima | |
| 2018/0215386 A1 | 8/2018 | Naserian et al. | |
| 2018/0223788 A1 | 8/2018 | Gerty | |
| 2018/0230919 A1 | 8/2018 | Nagashima et al. | |
| 2018/0244273 A1 | 8/2018 | Iwamoto et al. | |
| 2018/0265090 A1 | 9/2018 | Sharma et al. | |
| 2018/0273047 A1 | 9/2018 | Wang | |
| 2018/0320615 A1 | 11/2018 | Pirjaberi et al. | |
| 2018/0362020 A1 | 12/2018 | Kobler et al. | |
| 2019/0031171 A1 | 1/2019 | Iwamoto et al. | |
| 2019/0082149 A1 | 3/2019 | Correnti | |
| 2019/0093581 A1 | 3/2019 | Vadlamani | |
| 2019/0093619 A1 | 3/2019 | Vadlamani | |
| 2019/0100207 A1 | 4/2019 | Maruyama et al. | |
| 2019/0346012 A1 | 11/2019 | Gerty | |
| 2020/0116116 A1 | 4/2020 | Gerty | |
| 2020/0123995 A1 | 4/2020 | Vadlamani | |

FOREIGN PATENT DOCUMENTS

| | | |
|---|---|---|
| EP | 2410158 A1 | 1/2012 |
| EP | 2420663 A1 | 2/2012 |
| EP | 2 500 197 A2 | 9/2012 |
| EP | 2 578 871 A1 | 4/2013 |
| EP | 2 696 053 A1 | 2/2014 |
| EP | 2 500 179 B1 | 2/2018 |
| GB | 2519158 A | 4/2015 |
| JP | 2010-242621 A | 10/2010 |
| RU | 2 540 679 C1 | 2/2015 |
| WO | 2012/063389 A1 | 5/2012 |
| WO | 2016/014396 A1 | 1/2016 |

OTHER PUBLICATIONS

Notice of Allowance dated Jun. 13, 2019, issued in U.S. Appl. No. 15/945,070, filed Apr. 4, 2018, 8 pages.

Notice of Allowance dated Jul. 9, 2019, issued in U.S. Appl. No. 15/975,616, filed May 9, 2018, 8 pages.

Extended European Search Report dated May 25, 2018, issued in European Application No. 17199329.8, filed Oct. 31, 2017, 7 pages.

International Search Report and Written Opinion dated Aug. 22, 2019, issued in corresponding International Application No. PCT/US2019/031543, filed May 9, 2019, 10 pages.

International Search Report and Written Opinion dated Aug. 22, 2019, issued in corresponding International Application No. PCT/US2019/031554, filed May 9, 2019, 8 pages.

"Eco-Approach and Departure at Signalized Intersections: Preliminary Modeling Results," Fall/Winter Webinar Series, Nov. 20, 2013, U.S. Department of Transportation, 42 pages.

"Investigating the Potential Benefits of Broadcasted Signal Phase and Timing (SPaT) Data Under IntelliDrive(SM)," Final Report, May 20, 2011, California Path Program, Institute of Transportation Studies, University of California, Berkeley, 98 pages.

Govindswamy, K., et al., "Aspects of NVH Integration in Hybrid Vehicles," SAE International Journal of Passenger Cars—Mechanical Systems 2(1):1396-1405, 2009.

Ito, Y., et al., "Vibration-Reducing Motor Control for Hybrid Vehicles," R&D Review of Toyota CRDL 40(2):37-43, 2005.

Office Action dated Nov. 1, 2018, from related U.S. Appl. No. 15/716,315, filed Sep. 26, 2017, 30 pages.

International Search Report and Written Opinion dated Jan. 24, 2019, issued in International Application No. PCT/US2018/052726, filed Sep. 25, 2018, 9 pages.

U.S. Appl. No. 15/975,649, Notice of Allowance dated Feb. 13, 2020, 5 pgs.

Gerty, M.D., et al., "Intermittent Restart for Automatic Engine Stop Start System," U.S. Appl. No. 15/341,320, filed Nov. 2, 2016, 30 pgs.

U.S. Appl. No. 15/341,320, Notice of Allowance dated Dec. 6, 2017, 6 pages.

U.S. Appl. No. 15/716,315, Supplemental Notice of Allowance dated Sep. 17, 2019, 2 pages.

U.S. Appl. No. 15/975,616, Notice of Allowance dated Nov. 6, 2019, 5 pages.

U.S. Appl. No. 15/975,616, Supplemental Notice of Allowance dated Aug. 5, 2019, 2 pages.

(56) References Cited

OTHER PUBLICATIONS

U.S. Appl. No. 15/975,649, Office Action dated Oct. 31, 2019, 9 pgs.
U.S. Appl. No. 15/975,616, Office Action dated Mar. 31, 2020, 6 pages.
U.S. Appl. No. 15/975,649, Notice of Allowance dated Apr. 16, 2020, 2 pgs.

* cited by examiner

US 10,746,255 B2

SYSTEMS AND METHODS FOR REDUCING NOISE, VIBRATION, AND/OR HARSHNESS DURING ENGINE SHUTDOWN AND RESTART

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a vehicle comprising an internal combustion engine, an electric motor, an accessory drive, and an electronic control unit (ECU) is provided. The accessory drive has a drive shaft and an output shaft. The drive shaft of the accessory drive is coupled to an output of the internal combustion engine, and the output shaft of the accessory drive is coupled to the electric motor. The ECU is configured to initiate a shutdown process for the internal combustion engine; and to cause the electric motor to generate torque to counteract vibration induced by the internal combustion engine during the shutdown process.

In some embodiments, a method of reducing vibration generated by an internal combustion engine is provided. An engine control unit (ECU) detects a condition that causes a transition of an engine speed of the engine from a first engine speed to a second engine speed. The ECU determines an engine speed target profile for transitioning the engine speed of the engine, wherein the engine speed target profile specifies a plurality of expected engine speeds at a plurality of points in time following detection of the instruction. The ECU monitors the engine speed of the engine. The ECU determines a correction torque to drive the engine speed toward an expected engine speed at a given point in time according to the engine speed target profile; and causes an electric motor to apply the correction torque.

In some embodiments, a non-transitory computer-readable medium is provided. The computer-readable medium has computer-executable instructions stored thereon that, in response to execution by an engine control unit (ECU), cause the ECU to perform actions for reducing vibration generated by an internal combustion engine, the actions comprising: detecting, by the ECU, a condition that causes a transition of an engine speed of the engine from a first engine speed to a second engine speed; determining, by the ECU, an engine speed target profile for transitioning the engine speed of the engine, wherein the engine speed target profile specifies a plurality of expected engine speeds at a plurality of points in time following detection of the instruction; monitoring, by the ECU, the engine speed of the engine; determining, by the ECU, a correction torque to drive the engine speed toward an expected engine speed at a given point in time according to the engine speed target profile; and causing, by the ECU, an electric motor to apply the correction torque.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Numerous products have been developed that involve startup and shutdown of internal combustion engines within vehicles. For example, systems have been invented where a controller within the vehicle uses information from environmental sensors and vehicle state sensors to detect opportunities for engine-off cruising, where the internal combustion engine may be stopped and the vehicle may coast without power when possible to save fuel, such as while approaching a red traffic signal, while approaching an obstacle or stopped traffic within the roadway, while traversing a downhill grade, and other opportunities. Such systems may also automatically restart the internal combustion engine upon detecting the end of the condition that allowed for the engine-off cruising, such as a torque demand from a driver, an end of the downhill grade, a change in state of the traffic signal, and so on. As another example, systems have been invented to support periodic restart of the internal combustion engine in hoteling situations. In such systems, instead of leaving the internal combustion engine running while an operator is sleeping or otherwise not operating the vehicle, the internal combustion engine may be stopped to save fuel, and periodically restarted when a sensor within the vehicle determines that power from the internal combustion engine is needed to, for example, charge a battery, provide heat to prevent fuel gelling, and so on.

Figure 1:
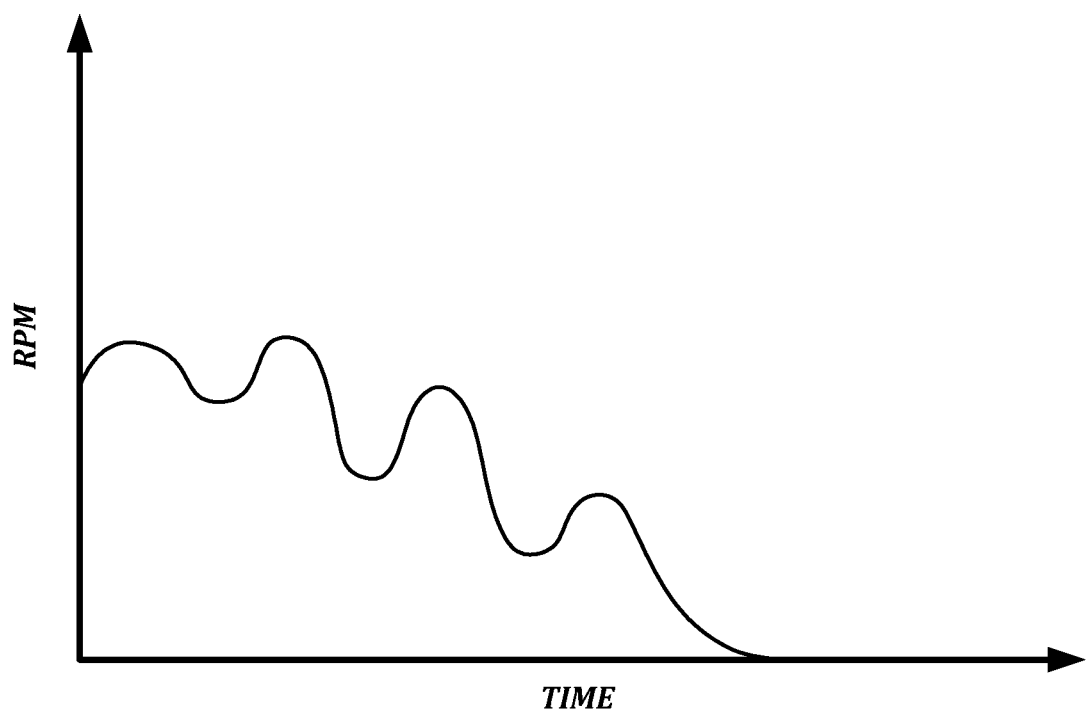
FIG. 1 is a chart that illustrates an example of the behavior of an internal combustion engine during shutdown, to show a problem within the prior art.

While these systems make it possible to reduce fuel consumption, one problem with these systems is that internal combustion engines in general, and diesel engines used with Class 8 trucks in particular, tend to generate unwanted torque pulses while transitioning through low engine speed states during startup and shutdown. FIG. 1 is a chart that illustrates an example of the behavior of an internal combustion engine during shutdown, to show this problem within the prior art. Though FIG. 1 illustrates the problem during shutdown, one of ordinary skill in the art will recognize that similar problems exist during startup when transitioning through low engine speeds. The horizontal axis of the chart shows the passage of time, and the vertical axis of the chart shows an engine speed of the internal combustion engine. While engine speed is typically denoted in rotations per minute (RPM), the chart in FIG. 1 is not necessarily to scale. The solid curve in the chart shows how the engine speed changes over time while the internal combustion engine is being shut down. The dashed curve in the chart shows a moving average or trend of the engine speed over time. As shown, the engine speed is generally falling, but due to the behavior of the internal combustion engine at low engine speeds, torque pulses are generated that cause the engine speed to fluctuate around the moving average engine speed as the moving average engine speed continues to fall.

These torque pulses contribute to undesirable amounts of noise, vibration, and harshness (NVH), and also lead to shaking of the cab of the vehicle. This is undesirable in the engine-off cruise scenario because it can lead to operator annoyance and unwillingness to engage the system, and is highly undesirable in the hoteling scenario because it can wake the operator. What is needed are techniques for reducing NVH during engine startup and shutdown in order to improve systems wherein startup and shutdown should happen as unobtrusively as possible.

In some embodiments of the present disclosure, an electric motor is used to generate correction torques to counteract the torque pulses generated by the internal combustion engine. In some embodiments, the electric motor may be mounted to an accessory drive such as a power take-off mechanism or a front end accessory drive (FEAD), in order to increase the ability to provide an after-market solution to reduce startup and shutdown NVH. In some embodiments, the correction torques may be used to enforce an engine speed target profile for startup or shutdown, and may be determined using a feedback control loop based on the engine speed.

Although exemplary embodiments of the present disclosure will be described hereinafter with reference to Class 8 trucks, it will be appreciated that aspects of the present disclosure have wide application, and therefore, may be suitable for use with many types of vehicles having internal combustion engines, such as passenger vehicles, buses, commercial vehicles, light and medium duty vehicles, etc. Accordingly, the following descriptions and illustrations herein should be considered illustrative in nature, and thus, not limiting the scope of the claimed subject matter.

Prior to discussing the details of various aspects of the present disclosure, it should be understood that several sections of the following description are presented largely in terms of logic and operations that may be performed by electronic components. These electronic components, which may be grouped in a single location or distributed through a vehicle, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links.

In the following description, numerous specific details are set forth in order to provide a thorough understanding of example embodiments of the present disclosure. It will be apparent to one skilled in the art, however, that many embodiments of the present disclosure may be practiced without some or all of the specific details. In some instances, well known process steps have not been described in detail in order not to obscure unnecessarily various aspects of the present disclosure. Furthermore, it will be appreciated the embodiments of the present disclosure may employ any of the features described herein.

Figure 2:
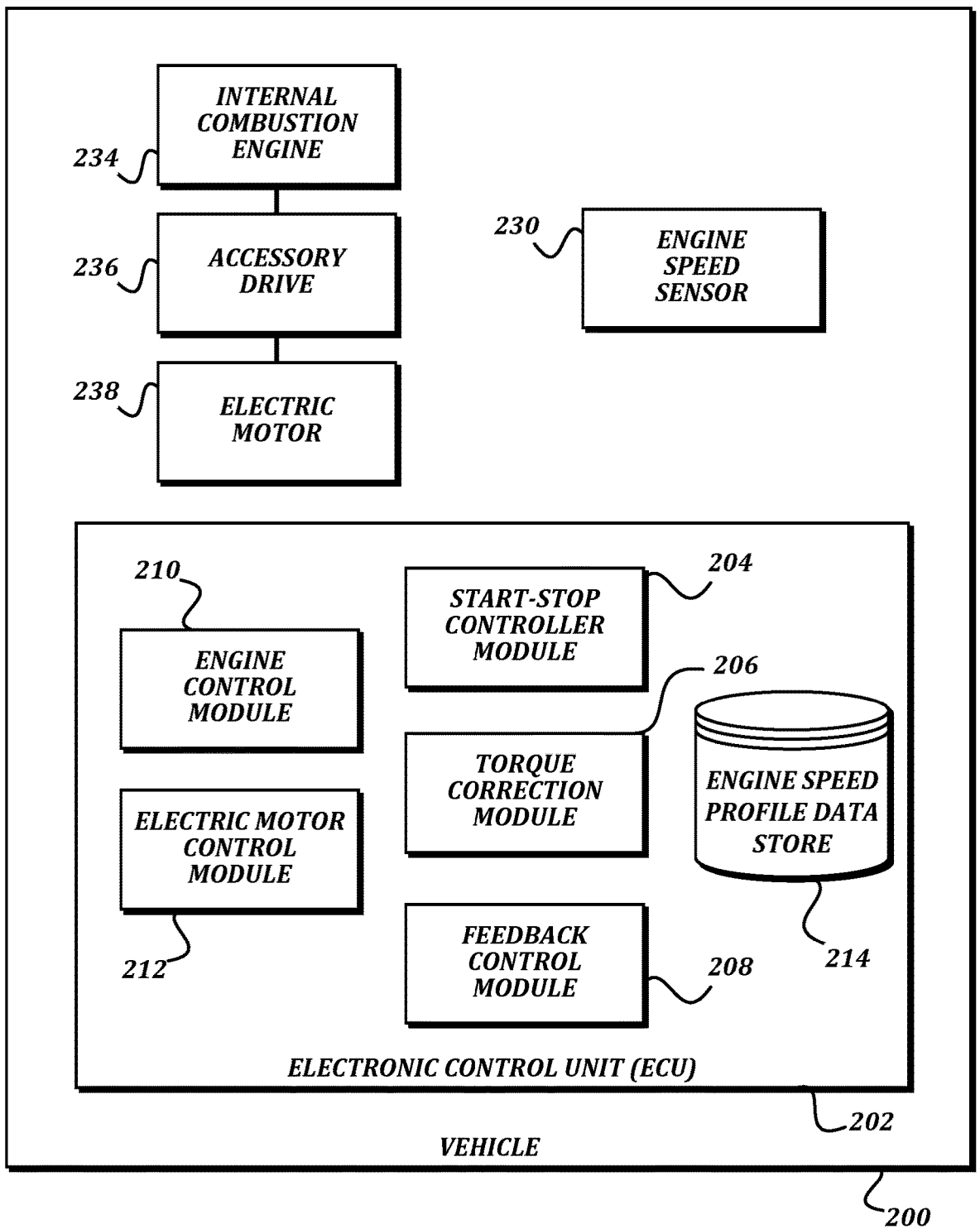
FIG. 2 is a block diagram that illustrates an example embodiment of a vehicle according to various aspects of the present disclosure.

FIG. 2 is a block diagram that illustrates an example embodiment of a vehicle according to various aspects of the present disclosure. In some embodiments, the vehicle 200 is a Class 8 truck, though in some embodiments other types of vehicles could be used. As illustrated, the vehicle 200 includes an internal combustion engine 234, an accessory drive 236, and an electric motor 238. The internal combustion engine 234 is the main power source for the vehicle 200, and is coupled to the powertrain (not illustrated).

The accessory drive 236 is coupled to an output of the internal combustion engine 234 in any suitable manner, including but not limited to being coupled via a gearbox to a crankshaft of the internal combustion engine 234, and being coupled to an accessory drive connector of a transmission that is in turn connected to the internal combustion engine 234. Two non-limiting types of accessory drives 236 are power take off (PTO) devices and front end accessory drive (FEAD) devices. In embodiments of the present disclosure, the accessory drive 236 is capable of bidirectionally transferring power to and from the internal combustion engine 234. In other words, the accessory drive 236 may receive power from the internal combustion engine 234 in order to power a downstream device, or may provide power to the internal combustion engine 234 from a downstream device in order to turn the internal combustion engine 234.

The electric motor 238 is coupled to the accessory drive 236 and to a battery (not illustrated). The electric motor 238 is configured to, at appropriate times, provide power through the accessory drive 236 to the internal combustion engine 234. This power can be used to start (or restart) the internal combustion engine 234, as described below. The electric motor 238 may also be able to, at appropriate times, receive power from the accessory drive 236 to charge the battery. In some embodiments, the electric motor 238 is of an appropriate size and rating to be able to turn the internal combustion engine 234 to a speed in a range of about 600-700 RPM. In some embodiments, the electric motor 238 and the battery to which it is coupled may operate on a 24V or 48V electrical system in order to increase the amount of available power. In some embodiments, the electric motor 238 may be capable of replacing a traditional starter motor for the vehicle 200, which may or may not be present. Further implementation details and use of each of these components 234, 236, 238 are, in general, known to one of ordinary skill in the art, and so are not described in further detail herein. While an electric motor 238 that is integrated into the drivetrain of the vehicle 200 or otherwise more closely integrated with the engine 234 may be used, certain technical benefits may be obtained by using an electric motor 238 that can be connected through the accessory drive 236. As a nonlimiting example of a technical benefit, connecting the electric motor 238 through the accessory drive 236 allows a vehicle 200 to have the electric motor 238 and the functionality described herein installed as an after-market product, thus not requiring the vehicle 200 to be designed to use the electric motor 238 in order to obtain the benefits of the present disclosure.

As illustrated, the vehicle 200 also includes an engine speed sensor 230 and an electronic control unit (ECU) 202. The vehicle 200 also includes other elements that are known to one of ordinary skill in the art, including but not limited to a transmission and a communication bus such as a CAN bus that allows communication between components of the vehicle 200. Because these elements are well known, they are not illustrated or described further herein for the sake of brevity.

In some embodiments, the engine speed sensor 230 is configured to determine a rotational (or other) speed at which the engine is operating. In some embodiments, values produced by the engine speed sensor 230 may be provided to other components of the vehicle 200 by an engine electronic control unit (ECU). In some embodiments, the engine speed sensor 230 may include an encoder or other device that physically measures the speed of an output shaft of the engine. In some embodiments, the engine speed sensor 230 may be capable of generating instantaneous engine speed values at a high rate. For example, in some embodiments, the engine speed sensor 230 may include a crank sensor that senses the motion of 60 teeth per revolution. Such a sensor may generate instantaneous engine speed values at rates between about 50 values per second to 100,000 values per second.

In some embodiments, the electronic control unit (ECU) 202 is an ECU computing device that is configured to receive signals from devices such as the engine speed sensor 230, to determine correction torques based on the received signals, and to transmit signals to the electric motor 238 to cause the electric motor 238 to generate the correction torque. As illustrated, the ECU 202 includes a start-stop controller module 204, a torque correction module 206, a feedback control module 208, an engine control module 210, an electric motor control module 212, and an engine speed profile data store 214.

In some embodiments, the start-stop controller module 204 is configured to detect conditions in which the internal combustion engine 234 should be automatically started or stopped, and to transmit commands to cause such actions to be taken. For example, the start-stop controller module 204 may be configured to detect conditions in which the internal combustion engine 234 may be automatically shut down in order to save fuel, such as while traversing a downhill grade or approaching a traffic control signal at which a stop will be required. Such a start-stop controller module 204 may also detect conditions in which the engine 234 will need to be restarted in order to provide motive power, such as transitioning from a downhill grade to a level grade or uphill grade, or a predicted time at which the traffic control signal will allow traffic to proceed. Such techniques for automatic stopping and starting of the engine 234 are described in commonly owned, co-pending U.S. application Ser. No. 15/716,315, filed Sep. 26, 2017, the entire disclosure of which is hereby incorporated by reference herein for all purposes.

As another example, the start-stop controller module 204 may be configured to detect conditions during hoteling or other states in which the engine 234 is stopped for a long period of time in which the engine 234 should be automatically restarted. These conditions may include, but are not limited to, a low battery indication for which the engine 234 needs to be restarted in order to charge the battery, a low temperature indication for which the engine 234 needs to be restarted in order to heat various components of the vehicle 200, and so on. Some such techniques for automatically starting the engine 234 are described in commonly owned, co-pending U.S. application Ser. No. 15/926,448, filed Mar. 20, 2018, the entire disclosure of which is hereby incorporated by reference herein for all purposes.

In some embodiments, the engine control module 210 is an electronic controller configured to manage operation of the engine 234. For example, the engine control module 210 may receive a torque request from another component of the vehicle 200, such as an accelerator pedal, and may control a fuel/air mixture, a valve timing, a fuel rate, and/or other settings of the engine 234 in order to cause the engine 234 to generate the requested amount of torque. In some embodiments, the electric motor control module 212 is similarly configured to manage operation of the electric motor 238, in that the electric motor control module 212 may receive a torque request from another component of the vehicle 200, and may cause the electric motor 238 to generate the requested amount of torque. In some embodiments, the electric motor control module 212 may also be capable of causing the electric motor 238 to generate a negative torque. In other words, the electric motor 238 may be instructed to receive torque from the internal combustion engine 234 through the accessory drive 236 in order to operate as a generator to store power in the batteries.

In some embodiments, the torque correction module 206 is configured to, along with the feedback control module 208, determine when correction torques should be generated in order to reduce noise, vibration, and harshness (NVH) while the engine 234 is stopping or starting, and what those correction torques should be. In some embodiments, the torque correction module 206 causes correction torques to be generated that cause a speed of the engine 234 to conform to an engine speed profile stored in the engine speed profile data store 214. Further description of the actions taken by the torque correction module 206 and the feedback control module 208, as well as the engine speed profiles stored in the engine speed profile data store 214, is provided below.

In general, the word "module," as used herein, refers to logic embodied in hardware or software instructions, which can be written in a programming language, such as C, C++, C#, COBOL, JAVA™, PHP, Perl, HTML, CSS, JavaScript, VBScript, ASPX, Microsoft .NET™, and/or the like. A module may be compiled into executable programs or written in interpreted programming languages. Modules may be callable from other modules or from themselves. Generally, the modules described herein refer to logical components that can be merged with other modules, or can be divided into sub-modules. The modules can be stored in any type of computer-readable medium or computer storage device and be stored on and executed by one or more general purpose computers, thus creating a special purpose computer configured to provide the module.

As understood by one of ordinary skill in the art, a "data store" as described herein may be any suitable device configured to store data for access by a module or another computing device. One example of a data store is a relational database management system (RDBMS). However, any other suitable storage technique and/or device capable of organizing and storing the data may be used, such as a key-value store, an object database, a look-up table, and/or the like. Examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, EPROMs, ROMs, and/or the like. Such a data store may be likely to be used locally by the vehicle 200. One of ordinary skill in the art will recognize that a single data store described herein may be separated into multiple data stores without departing from the scope of the present disclosure.

Though the ECU 202 is illustrated as a single unit, in some embodiments, the modules illustrated within the ECU 202 may be split amongst separate computing devices. For example, a first ECU may provide the engine control module 210, a second ECU may provide the electric motor control module 212, and a third ECU may provide the start-stop controller module 204, the torque correction module 206, and the feedback control module 208. Any other combinations of modules and ECUs may also be used without departing from the scope of the present disclosure.

The various components illustrated in FIG. 2 may communicate with each other through a vehicle-wide communications network (not shown). Those skilled in the art and others will recognize that the vehicle-wide communications network may be implemented using any number of different communication protocols such as, but not limited to, Society of Automotive Engineers' ("SAE") J1587, SAE J1922, SAE J1939, SAE J1708, and combinations thereof.

Figure 3:
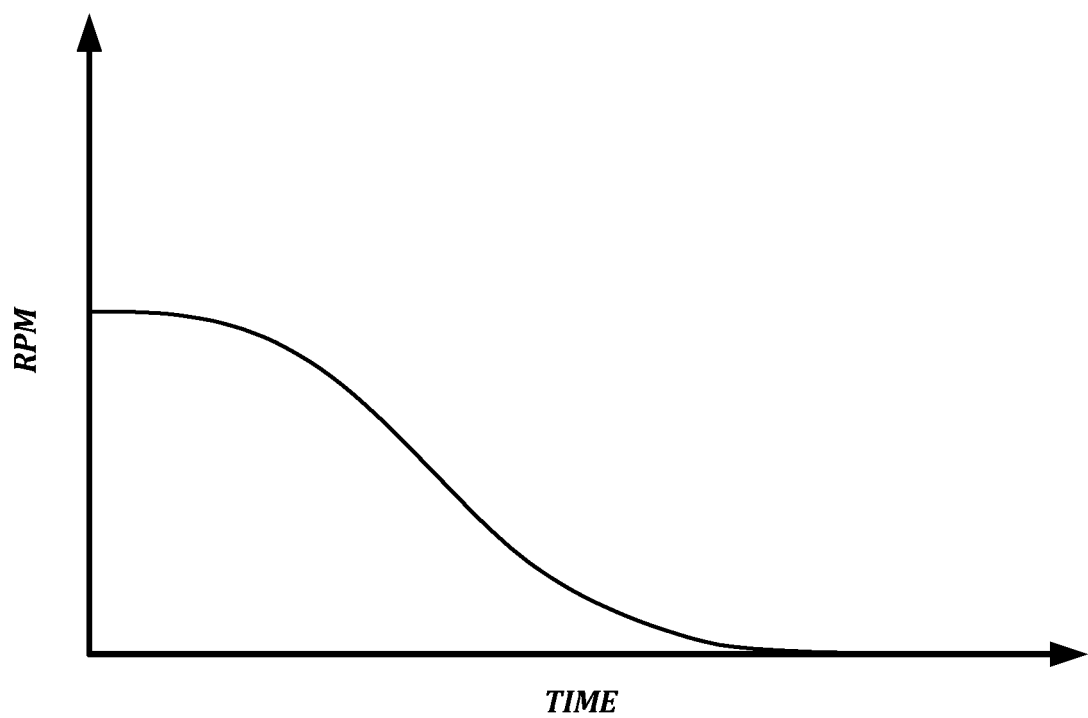
FIG. 3 is a chart that illustrates an example embodiment of an engine speed target profile according to various aspects of the present disclosure.

FIG. 3 is a chart that illustrates an example embodiment of an engine speed target profile according to various aspects of the present disclosure. Similar to FIG. 1, the chart in FIG. 3 includes a horizontal axis that shows the passage of time, and a vertical axis that shows an engine speed target. The solid curve in FIG. 3 is the engine speed target profile, and denotes how the engine speed target is expected to change over time, taking the engine speed smoothly from a start engine speed at the zero time index to zero engine speed as the curve advances along the horizontal axis. The shape of the curve of the engine speed target profile may be determined in any suitable manner. As one example, the curve may reduce the engine speed in a linear fashion. As another example, the curve may be chosen to match the moving average engine speed during a normal shutdown. As will be understood by one of ordinary skill in the art, similarly shaped or designed engine speed target profile curves may be used to show an increase in engine speed during startup.

Figure 4A:
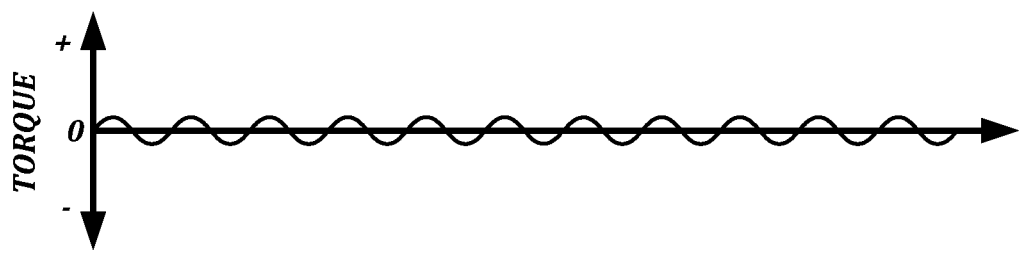
FIGS. 4A and 4B are charts that illustrate the relationship between correction torques generated by example embodiments of the present disclosure and the engine speed over time in example embodiments of the present disclosure.
Figure 4B:
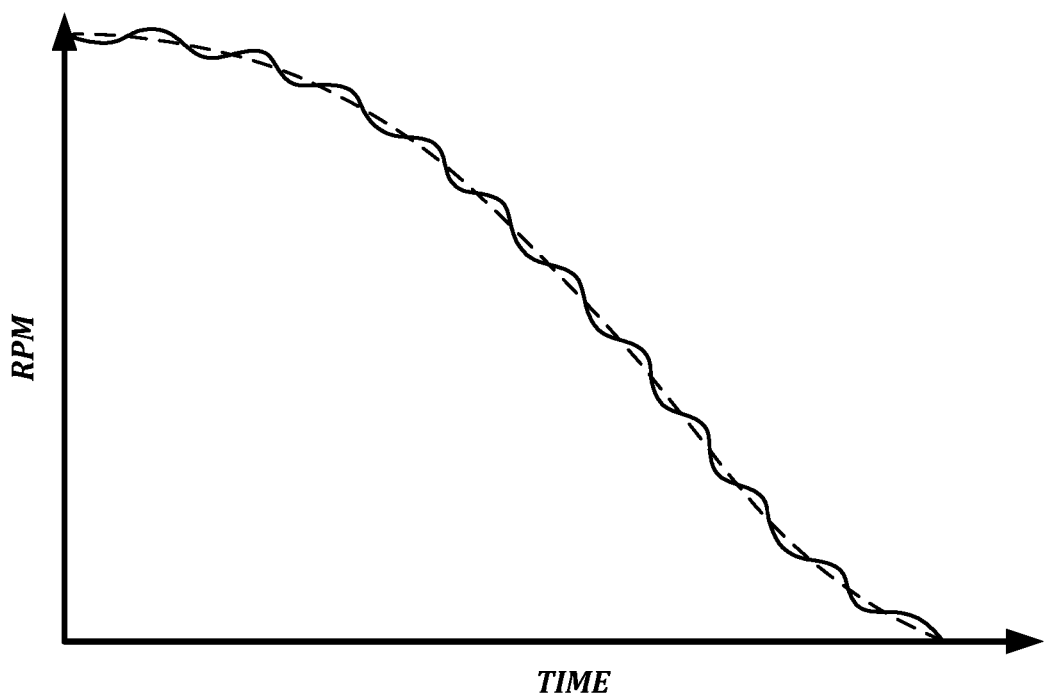

FIGS. 4A and 4B are charts that illustrate the relationship between correction torques generated by example embodiments of the present disclosure and the engine speed over time in example embodiments of the present disclosure. The chart in FIG. 4A includes a horizontal axis that shows the passage of time, and a vertical axis that shows an amount of correction torque generated by an example embodiment of the present disclosure. The solid curve in FIG. 4A shows the amount of correction torque being generated over time. As shown, the correction torque can be either positive (if the current engine speed is falling below the expected engine speed indicated by the engine speed target profile) or negative (if the current engine speed is rising above the expected engine speed indicated by the engine speed target profile).

The chart in FIG. 4B includes a horizontal axis that shows the passage of time, and a vertical axis that shows an engine speed. Neither FIG. 4A nor FIG. 4B is necessarily to scale, though the horizontal axes of the two charts are aligned to approximately illustrate the relationship between the information. The solid curve in FIG. 4B illustrates the engine speed, while the dashed curve in FIG. 4B illustrates the engine speed target profile being used. As shown, the application of the correction torques has forced the engine speed to much more closely match the engine speed target profile than the uncorrected engine speed shown in FIG. 1. By forcing the engine speed to conform to this engine speed target profile, the NVH generated by the shutdown process is greatly reduced. One of ordinary skill in the art will recognize that similar results happen for embodiments wherein the engine speed target profile takes the engine from a stopped state to a running state instead of from a running state to a stopped state.

Figure 5A:
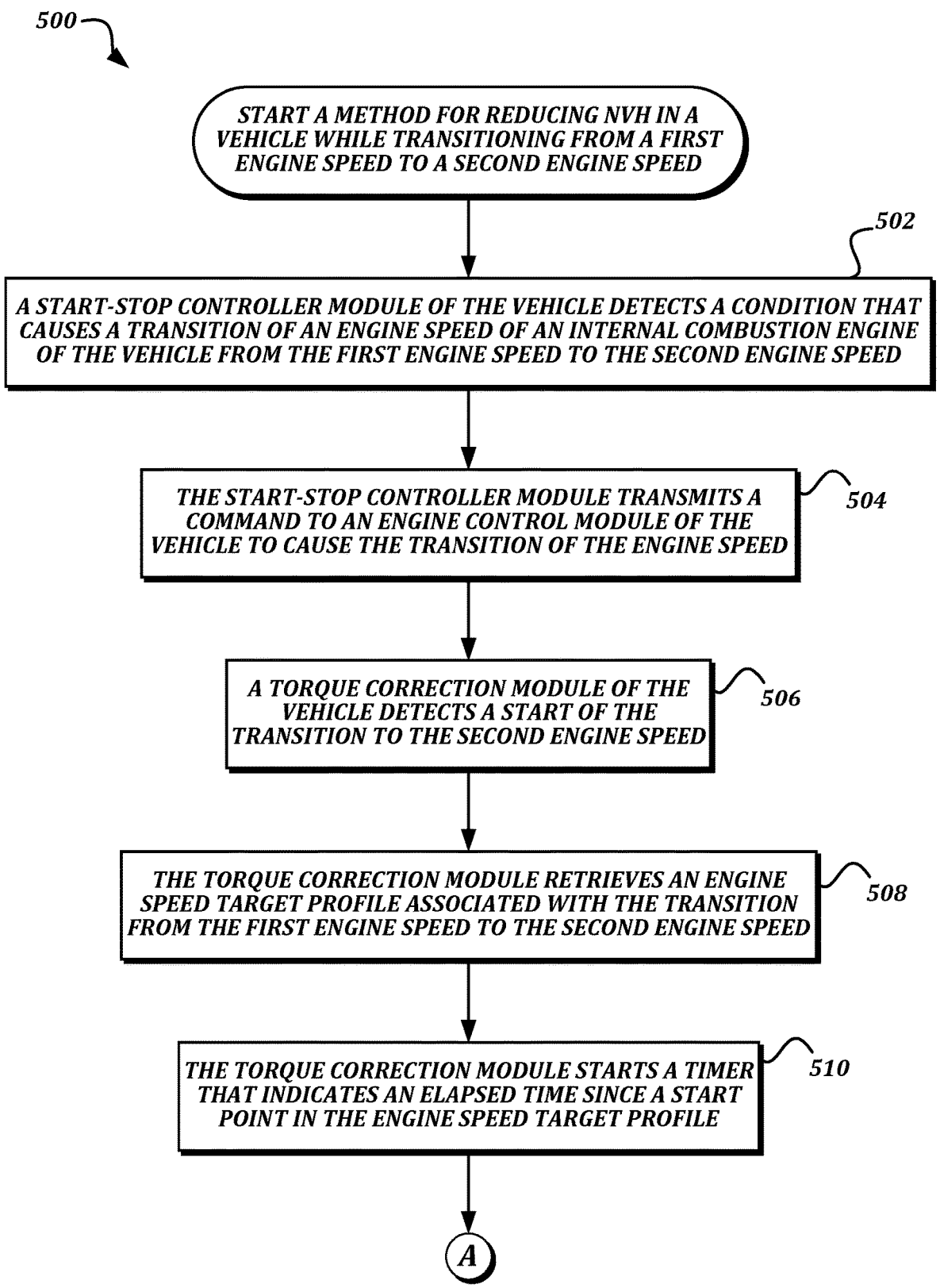
FIGS. 5A-5B are a flowchart that illustrates an example embodiment of a method for reducing NVH in a vehicle while transitioning from a first engine speed to a second engine speed according to various aspects of the present disclosure.
Figure 5B:
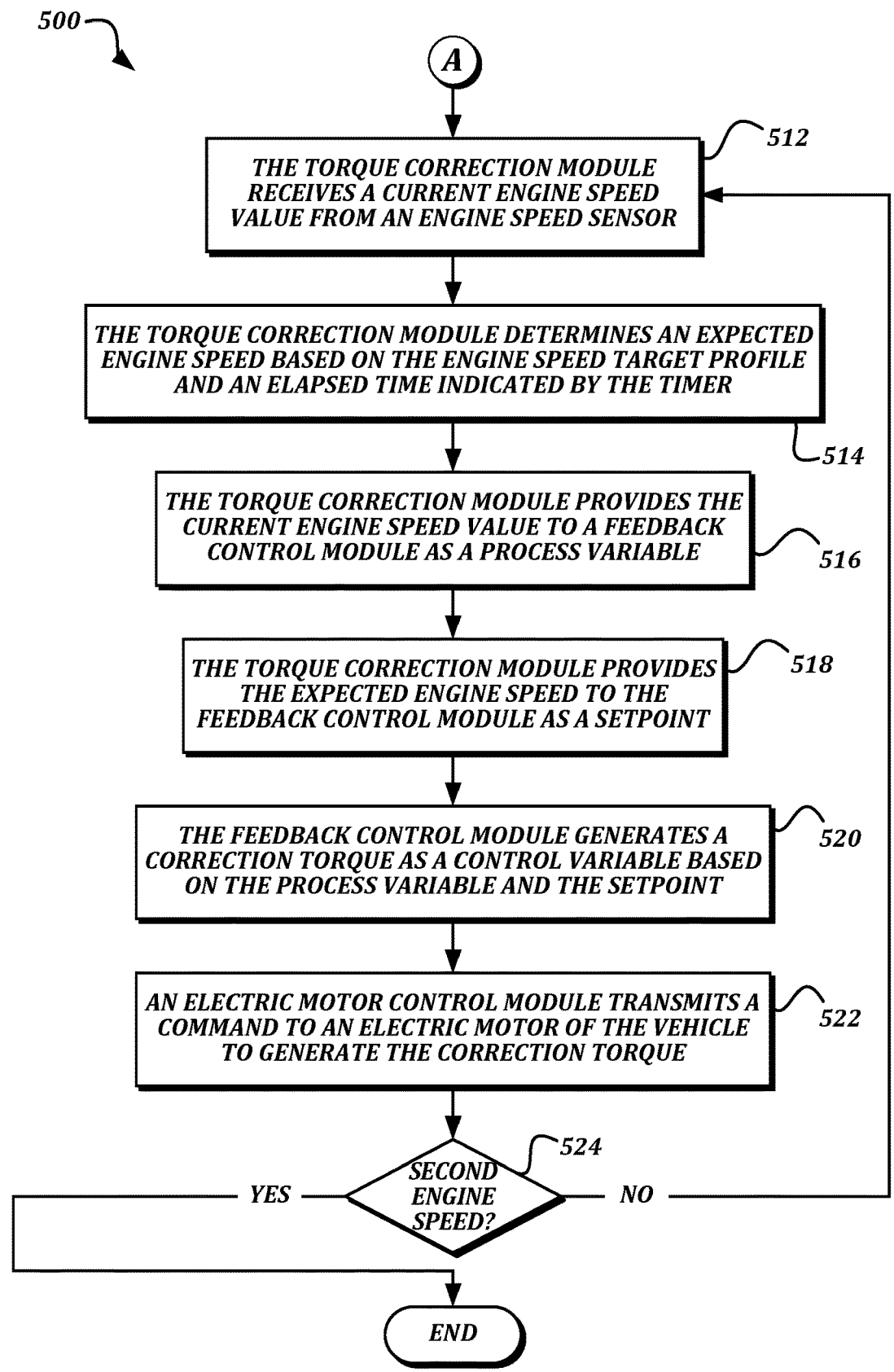

FIGS. 5A-5B are a flowchart that illustrates an example embodiment of a method for reducing NVH in a vehicle while transitioning from a first engine speed to a second engine speed according to various aspects of the present disclosure. From a start block, the method 500 proceeds to block 502, where a start-stop controller module 204 of the vehicle 200 detects a condition that causes a transition of an engine speed of an internal combustion engine 234 of the vehicle 200 from the first engine speed to the second engine speed. In some embodiments, the method 500 may be reducing NVH while the engine 234 is stopping, in which case the first engine speed may be any non-zero engine speed at which the engine 234 operates, and the second engine speed may be zero (or another value that indicates that the engine 234 is stopped). In some embodiments, the method 500 may be reducing NVH during startup of the engine 234, in which case the first engine speed may be zero (or another value that indicates that the engine 234 is stopped), and the second engine speed may be any non-zero engine speed at which the engine 234 operates. Typically, the second engine speed in this scenarios will be at least an idle speed, though any other engine speed may be used. In some embodiments, the first engine speed may be any speed, and the second engine speed may be any other speed, though the method 500 is particularly useful in helping to avoid NVH while the engine 234 is transitioning through low engine speed states during startup and shutdown.

At block 504, the start-stop controller module 204 transmits a command to an engine control module 210 of the vehicle 200 to cause the transition of the engine speed. In some embodiments, the engine control module 210 may change the fuel/air mixture in order to transition the engine speed, such as cutting the fuel in order to transition to a shutdown state, or adding fuel in order to transition to a startup state. In some embodiments, the engine control module 210 may provide an instruction to a cylinder decompression device to open valves, though the method 500 may be particularly useful in the absence of cylinder decompression due to increased NVH generated by the spring force within closed cylinders. The details of how an engine control module 210 would cause transition from a first engine speed to a second engine speed, such as startup or shutdown of the engine 234, are generally known, and so are not described in further detail herein for the sake of brevity.

Next, at block 506, a torque correction module 206 of the vehicle 200 detects a start of the transition to the second engine speed. In some embodiments, the torque correction module 206 may detect the commands transmitted by the engine control module 210 or the start-stop controller module 404 to other components of the vehicle 200 in order to cause the transition. In some embodiments, the torque correction module 206 may receive a specific command from the start-stop controller module 204 to cause the torque correction module 206 to activate. In some embodiments, the torque correction module 206 may detect the presence of NVH using a vibration sensor, or may detect that the engine speed has dropped below a predetermined threshold or has started to increase from zero to indicate the start of the transition.

The method 500 then proceeds to block 508, where the torque correction module 206 retrieves an engine speed target profile associated with the transition from the first engine speed to the second engine speed. In some embodiments, the torque correction module 206 may select an engine speed target profile from multiple engine speed target profiles stored in the engine speed profile data store 214 based on the first engine speed and the second engine speed. For example, the torque correction module 206 may select a first engine speed target profile when transitioning to a shutdown state from a running state, and may select a second engine speed target profile when transitioning from a running state to a shutdown state. As another example, the torque correction module 206 may select from multiple shutdown engine speed target profiles based on the first engine speed, in that the multiple engine speed target profiles may be shaped differently depending on how high the first engine speed is. In some embodiments, the torque correction module 206 may determine whether a startup engine speed target profile or a shutdown engine speed target profile is appropriate based on information within the commands detected at block 506, based on a direction of change of the current engine speed, or using any other suitable technique.

At block 510, the torque correction module 206 starts a timer that indicates an elapsed time since a start point in the engine speed target profile. The value of the timer will subsequently be used as an index into the engine speed target profile, such that the expected engine speed according to the engine speed target profile at a given point in time may be determined. In some embodiments, the start of the timer may coincide with the first point in the engine speed target profile. In some embodiments, the start of the timer may coincide with a point within the engine speed target profile associated with the first engine speed. The method 500 then proceeds to a continuation terminal ("terminal A").

From terminal A (FIG. 5B), the method 500 proceeds to block 512, where the torque correction module 206 receives a current engine speed value from an engine speed sensor 230. This may be done using any typical technique for obtaining a value from a vehicle sensor, including but not limited to transmitting a query to the engine speed sensor 230, receiving a message from the engine speed sensor 230, requesting the engine speed value from the engine control module 210, or any other suitable technique.

At block 514, the torque correction module 206 determines an expected engine speed based on the engine speed target profile and an elapsed time indicated by the timer. In some embodiments, the torque correction module 206 may use the elapsed time indicated by the timer as an index into the engine speed target profile, and will find the expected engine speed associated with the index. Stated in terms of the chart illustrated in FIG. 4A, the torque correction module 206 may use the elapsed time to find a point on the X-axis, and then may determine the height of the engine speed target profile on the Y-axis at that point to determine the expected engine speed. In embodiments in which the engine speed target profile is stored as a look-up table, the torque correction module 206 may find the value within the look-up table associated with the elapsed time.

Next, at block 516, the torque correction module 206 provides the current engine speed value to a feedback control module 208 as a process variable, and at block 518, the torque correction module 206 provides the expected engine speed to the feedback control module as a setpoint. At block 520, the feedback control module 208 generates a correction torque as a control variable based on the process variable and the setpoint. As illustrated and described, the feedback control module 208 essentially implements a feedback control loop that is executed in blocks 516-520. Any suitable feedback control technique known to one of ordinary skill in the art may be used. For example, in some embodiments, the feedback control module 208 implements a proportional-integral-derivative (PID) control loop in order to generate a correction torque based on the current engine speed value and the expected engine speed. In other embodiments, other feedback control techniques may be used that cause the process variable (current engine speed value) to be moved toward the setpoint (expected engine speed value) by manipulating the control variable (correction torque). While other techniques for detecting the torque pulses generated by the engine 234 may be used (including, but not limited to, modeling performance of the engine and using a crankshaft position, a fuel rate, an EGR rate, and other factors to determine an instantaneous torque), certain benefits are obtained by using a feedback control loop based on the engine speed. For example, using an engine speed sensor 230 as the sole input for determining the correction torque greatly reduces the complexity of the system, at least in that it does not require a detailed model of engine performance, nor does it require detailed knowledge of crankshaft position. Further, many vehicles will already have engine speed sensors 230 installed. This increases the ability to retrofit existing vehicles with the functionality described herein, and allows this functionality to be used in vehicles with different engine sizes, models, and configurations without having to create a new model for each engine.

Next, at block 522, an electric motor control module 212 transmits a command to an electric motor 238 of the vehicle 200 to generate the correction torque. As shown in FIG. 2, the electric motor 238 transmits the correction torque through the accessory drive 236. In some embodiments, the correction torque may be calculated as an absolute torque to be applied, and the electric motor control module 212 may determine a voltage and/or gear ratio to use to apply the correction torque. In some embodiments, the voltage and/or gear ratio may themselves be the control variable, in which case the electric motor control module 212 may receive the values from the torque correction module 206 and use them directly to control the electric motor 438.

The method 500 then proceeds to decision block 524, where a determination is made regarding whether the internal combustion engine 234 has reached the second engine speed. In other words, if transitioning to a stopped state, the method 500 checks to see if the engine 234 has stopped yet, and if starting, the method 500 checks to see if the engine 234 has reached a minimum working speed indicated by the engine speed target profile. If the internal combustion engine 234 has not yet reached the second engine speed, then the result of decision block 524 is NO, and the method 500 returns to block 512. Otherwise, if the internal combustion engine 234 has reached the second engine speed, then the result of decision block 524 is YES, and the method 500 proceeds to an end block to terminate.

One of ordinary skill in the art will recognize that the method 500 operates as control loop. In some embodiments, the loop implemented by the method 500 may operate at high speed in order to effectively counteract NVH, such as a speed between 50 loops per second and 100,000 loops per second. In some embodiments, any other loop frequency may be used that is effective for counteracting NVH within a particular vehicle 200.

While illustrative embodiments have been illustrated and described, it will be appreciated that various changes can be made therein without departing from the spirit and scope of the invention.

The embodiments of the invention in which an exclusive property or privilege is claimed are defined as follows:

1. A vehicle, comprising:
  an internal combustion engine;
  an electric motor;
  an accessory drive having a drive shaft and an output shaft, wherein the drive shaft of the accessory drive is coupled to an output of the internal combustion engine, and the output shaft of the accessory drive is coupled to the electric motor; and
  an electronic control unit (ECU) configured to:
    initiate a shutdown process for the internal combustion engine;

receive, at a first time, a first engine speed of the internal combustion engine;
select, based on the first engine speed, a first engine profile from a plurality of engine profiles;
cause initiation of a timer; and
cause the electric motor to generate torque to counteract vibration induced by the internal combustion engine during the shutdown process, wherein causing the electric motor to generate the torque comprises at least:
 determining, for a second time following the first time, an expected engine speed based on the first engine profile and an elapsed time of the timer;
 determining a second engine speed at the second time; and
 determining the torque based on the second engine speed and the expected engine speed.

2. The vehicle of claim 1, further comprising:
an engine speed sensor configured to provide engine speed values to the ECU at a rate of at least 50 values per second or at least 60 values per revolution of the internal combustion engine.

3. The vehicle of claim 2, wherein causing the electric motor to generate torque to counteract vibration induced by the internal combustion engine during the shutdown process includes:
using a feedback control loop to determine a correction torque to be generated by the electric motor.

4. The vehicle of claim 3, wherein the feedback control loop is a proportional-integral-derivative (PID) control loop.

5. The vehicle of claim 3, wherein a process variable of the feedback control loop is the engine speed value, wherein a control variable of the feedback control loop is the correction torque, and wherein a setpoint of the feedback control loop is an expected engine speed.

6. The vehicle of claim 5, wherein the expected engine speed is adjusted over time according to an engine speed target profile.

7. A method of reducing vibration generated by an internal combustion engine, the method comprising:
detecting, by an engine control unit (ECU), a condition that causes a transition of an engine speed of the engine from a first engine speed to a second engine speed;
selecting, by the ECU and based on the first engine speed, an engine speed target profile from a plurality of engine speed target profiles for transitioning the engine speed of the engine, wherein the engine speed target profile specifies a plurality of expected engine speeds at a plurality of points in time following detection of the instruction;
initiating a timer;
monitoring, by the ECU, the engine speed of the engine;
determining, by the ECU, a correction torque to drive the engine speed toward an expected engine speed at a given point in time according to the engine speed target profile and an elapsed time of the timer; and
causing, by the ECU, an electric motor to apply the correction torque.

8. The method of claim 7, wherein monitoring the engine speed of the engine includes receiving engine speed values from an engine speed sensor at a rate of at least 50 values per second or at least 60 values per revolution of the engine; and
wherein the correction torque is determined for each received engine speed value.

9. The method of claim 7, wherein the first engine speed is an operating engine speed and the second engine speed is a stopped engine speed; or
the first engine speed is a stopped engine speed and the second engine speed is an operating engine speed.

10. The method of claim 7, wherein the correction torque is positive when the engine speed is lower than the expected engine speed, and wherein the correction torque is negative when the engine speed is higher than the expected engine speed.

11. The method of claim 7, wherein the determining correction torque includes using a feedback control loop.

12. The method of claim 11, wherein the feedback control loop includes a proportional-integral-derivative (PID) control loop.

13. The method of claim 11, wherein a process variable of the feedback control loop is the engine speed, wherein a control variable of the feedback control loop is the correction torque; and wherein a setpoint of the feedback control loop is determined by the engine speed target profile.

14. A non-transitory computer-readable medium having computer-executable instructions stored thereon that, in response to execution by an engine control unit (ECU), cause the ECU to perform actions for reducing vibration generated by an internal combustion engine, the actions comprising:
detecting, by the ECU, a condition that causes a transition of an engine speed of the engine from a first engine speed to a second engine speed, wherein detecting the condition comprises detecting vibration from a vibration sensor;
selecting, by the ECU and based on the first engine speed, an engine speed target profile from a plurality of engine speed target profiles for transitioning the engine speed of the engine, wherein the engine speed target profile specifies a plurality of expected engine speeds at a plurality of points in time following detection of the instruction;
initiating a timer;
monitoring, by the ECU, the engine speed of the engine;
determining, by the ECU, a correction torque to drive the engine speed toward an expected engine speed at a given point in time according to the engine speed target profile and an elapsed time of the timer; and
causing, by the ECU, an electric motor to apply the correction torque.

15. The computer-readable medium of claim 14, wherein monitoring the engine speed of the engine includes receiving engine speed values from an engine speed sensor at a rate of at least 50 values per second or at least 60 values per revolution of the engine; and
wherein the correction torque is determined for each received engine speed value.

16. The computer-readable medium of claim 14, wherein the first engine speed is an operating engine speed and the second engine speed is a stopped engine speed; or
the first engine speed is a stopped engine speed and the second engine speed is an operating engine speed.

17. The computer-readable medium of claim 14, wherein the correction torque is positive when the engine speed is lower than the expected engine speed, and wherein the correction torque is negative when the engine speed is higher than the expected engine speed.

18. The computer-readable medium of claim 14, wherein determining the correction torque includes using a feedback control loop.

19. The computer-readable medium of claim 18, wherein the feedback control loop includes a proportional-integral-derivative (PID) controller.

20. The computer-readable medium of claim 18, wherein a process variable of the feedback loop is the engine speed, wherein a control variable of the feedback loop is the correction torque; and wherein a setpoint of feedback control loop is determined by the engine speed target profile.

* * * * *